United States Patent
Ramésh et al.

[19]

[11] Patent Number: 5,943,324
[45] Date of Patent: Aug. 24, 1999

[54] METHODS AND APPARATUS FOR MOBILE STATION TO MOBILE STATION COMMUNICATIONS IN A MOBILE SATELLITE COMMUNICATION SYSTEM

[75] Inventors: Rajaram Ramésh, Cary; Paul W. Dent, Pittsboro, both of N.C.; Stanley L. Reinhold, Norristown, Pa.

[73] Assignee: Ericsson, Inc., Research Triangle Park, N.C.

[21] Appl. No.: 09/059,045

[22] Filed: Apr. 13, 1998

Related U.S. Application Data

[63] Continuation of application No. 08/888,938, Jul. 7, 1997, abandoned, and a continuation of application No. 08/581,110, Dec. 29, 1995, abandoned, which is a continuation-in-part of application No. 08/179,954, Jan. 11, 1994, Pat. No. 5,539,730, said application No. 08/888,938, is a continuation of application No. 08/402,456, Mar. 10, 1995, abandoned.

[51] Int. Cl.⁶ .............................. H04B 7/212; H04J 3/18
[52] U.S. Cl. .................. 370/321; 370/468; 370/477; 370/521; 370/545; 455/12.1
[58] Field of Search ................... 370/310, 315, 370/316, 319, 321, 323, 324–326, 345, 347, 464, 465, 468, 477, 498, 501, 545, 521; 455/12.1, 11.1; 375/211, 213; 340/825.18; 379/338

[56] References Cited

U.S. PATENT DOCUMENTS

| | | | |
|---|---|---|---|
| 3,879,580 | 4/1975 | Schlosser et al. | 370/324 |
| 3,879,581 | 4/1975 | Schlosser et al. | 370/324 |
| 4,135,156 | 1/1979 | Sanders, Jr. et al. | 370/316 |
| 4,145,573 | 3/1979 | Arnold | 370/323 |
| 4,181,886 | 1/1980 | Cooperman | 342/352 |
| 4,188,578 | 2/1980 | Reudink et al. | 370/323 |
| 4,332,026 | 5/1982 | Alvarez, III et al. | 370/347 |
| 4,586,177 | 4/1986 | Kaul | 370/321 |
| 4,628,506 | 12/1986 | Sperlich | 370/323 |
| 4,752,925 | 6/1988 | Thompson et al. | 370/324 |

(List continued on next page.)

FOREIGN PATENT DOCUMENTS

| | | |
|---|---|---|
| 139 034 | 5/1985 | European Pat. Off. . |
| 507 384 | 10/1992 | European Pat. Off. . |
| 2 221 368 | 1/1990 | United Kingdom . |
| WO91/07024 | 5/1991 | WIPO . |
| WO92/19050 | 10/1992 | WIPO . |
| WO95/19078 | 7/1995 | WIPO . |
| WO96/28900 | 9/1996 | WIPO . |

OTHER PUBLICATIONS

Yoshida Junko et al., (Cable–modems make the scene, Electronic Engineering Times, p1, 2p, May 1995.

DiPilato Joe, "Cell–phone demand spurs shift to digital", Electronic Engineering Times P87, 2p, Oct. 1997.

*Primary Examiner*—Douglas W. Olms
*Assistant Examiner*—Seema S. Rao
*Attorney, Agent, or Firm*—Burns, Doane, Swecker & Mathis, L.L.P.

[57] ABSTRACT

Methods and apparatus for mobile station to mobile station communications in a mobile satellite communications system include an asymmetrical TDMA formatting scheme. According to exemplary embodiments, a first mobile station broadcasts a first signal to an orbiting satellite using a first TDMA format. The satellite receives the first signal, maps the first TDMA format to a second TDMA format and broadcasts a second signal having the second TDMA format to a second mobile station. Advantageously, exemplary embodiments utilize an elastic buffer to allow the satellite to map the uplink TDMA format to the downlink TDMA format without having to demodulate and re-modulate communications signals.

37 Claims, 10 Drawing Sheets

U.S. PATENT DOCUMENTS

| | | | |
|---|---|---|---|
| 4,858,225 | 8/1989 | deSantis | 370/323 |
| 4,901,310 | 2/1990 | Ichiyoshi | 370/323 |
| 4,931,802 | 6/1990 | Assal | 370/323 |
| 5,048,059 | 9/1991 | Dent | 370/323 |
| 5,113,394 | 5/1992 | Kotzin | 370/315 |
| 5,130,979 | 7/1992 | Ohtawa | 370/374 |
| 5,199,031 | 3/1993 | Dahlin | 370/329 |
| 5,239,557 | 8/1993 | Dent | 370/342 |
| 5,241,702 | 8/1993 | Dent | 455/303 |
| 5,287,541 | 2/1994 | Davis et al. | 455/427 |
| 5,331,666 | 7/1994 | Dent | 375/341 |
| 5,392,450 | 2/1995 | Nossen | 370/321 |
| 5,438,569 | 8/1995 | Kapadia et al. | 370/463 |
| 5,473,601 | 12/1995 | Rosen et al. | 370/319 |
| 5,523,997 | 6/1996 | Bishop, Jr. | 370/351 |
| 5,539,730 | 7/1996 | Dent | 370/280 |
| 5,557,645 | 9/1996 | Dent | 375/340 |
| 5,579,307 | 11/1996 | Richetta et al. | 370/409 |
| 5,619,210 | 4/1997 | Dent | 370/316 |
| 5,619,503 | 4/1997 | Dent | 370/330 |
| 5,642,358 | 6/1997 | Dent | 370/323 |
| 5,663,957 | 9/1997 | Dent | 370/347 |
| 5,712,850 | 1/1998 | Elia et al. | 370/326 |

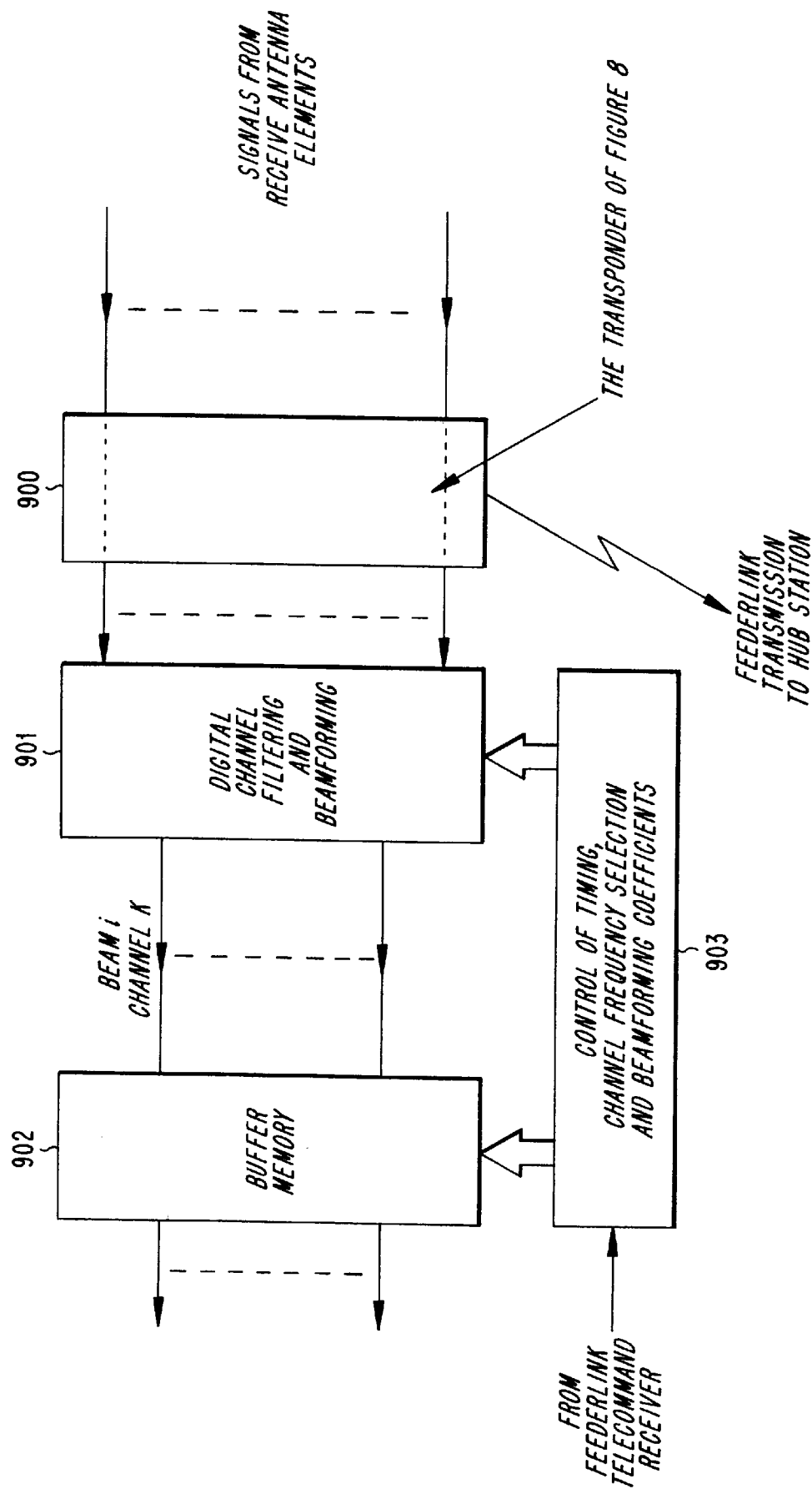

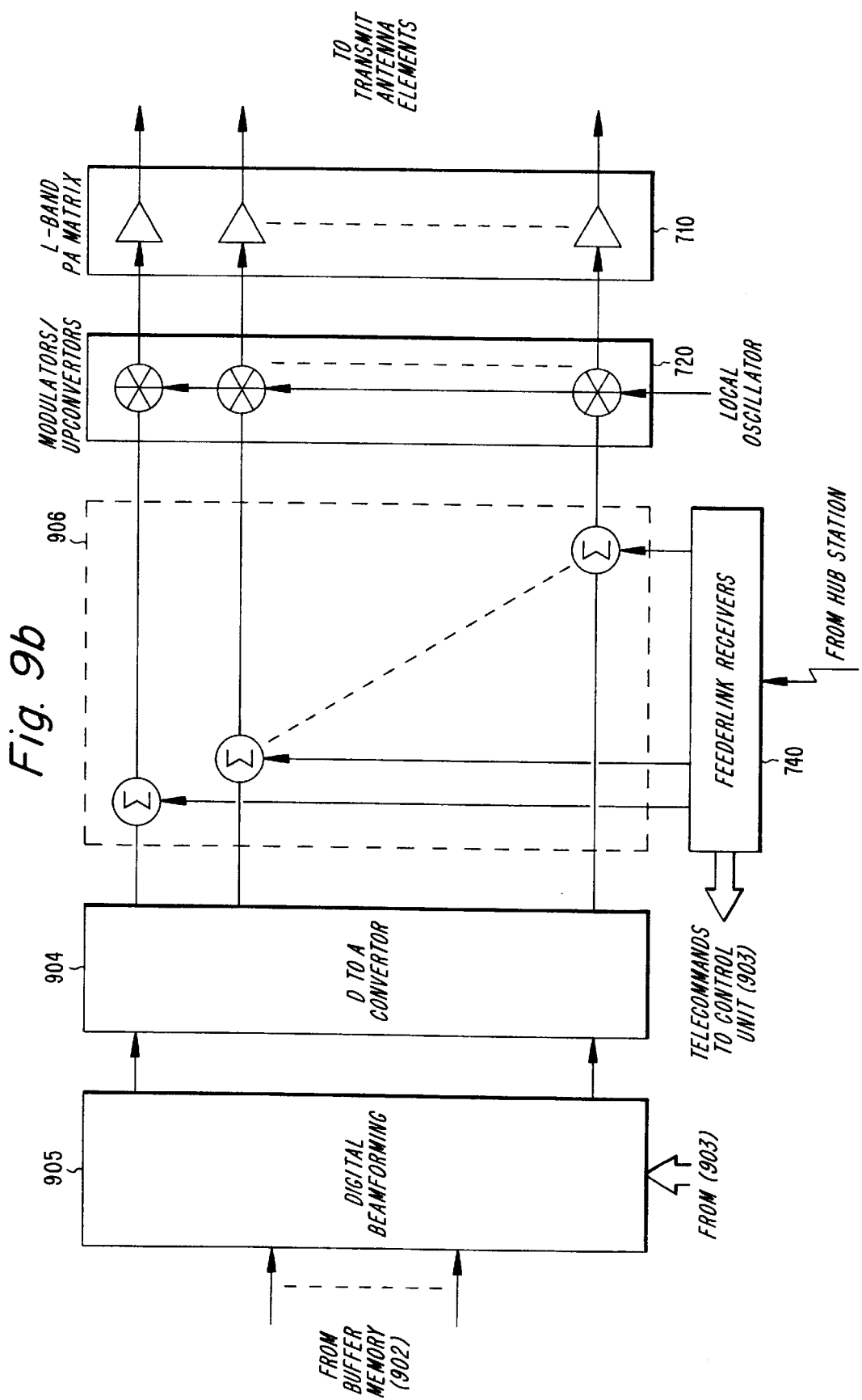

METHODS AND APPARATUS FOR MOBILE STATION TO MOBILE STATION COMMUNICATIONS IN A MOBILE SATELLITE COMMUNICATION SYSTEM

CROSS-REFERENCE TO RELATED APPLICATIONS

The present application is a Continuation Application of U.S. patent application Ser. No. 08/888,938, entitled "Method and Apparatus for Mobile Station to Mobile Station Communications in a Mobile Satellite Communication System" and filed Jul. 7, 1997 in the name of Ramesh et al. and now abandoned (as a File Wrapper Continuation Application of U.S. patent application Ser. No. 08/402,456, filed Mar. 10, 1995 in the name of Ramesh et al. and now abandoned). The present application is also a Continuation Application of U.S. patent application Ser. No. 08/581,110, now abandoned entitled "Time Compressing Transponder" and filed Dec. 29, 1995 in the name of Dent (as a Continuation-In-Part Application of U.S. patent application Ser. No. 08/179,954, now U.S. Pat. No. 5,539,730, entitled "TDMA/FDMA/CDMA Hybrid Radio Access Methods" and filed Jan. 11, 1994 in the name of Dent). Each of the above identified patent applications, i.e. application Ser. Nos. 08/888,938, 08/402,456, 08/581,110 and 08/179,954, as well as the above identified patent, i.e. U.S. Pat. No. 5,539,730, is incorporated herein in its entirety by reference.

FIELD OF THE INVENTION

The present invention relates to time division multiple access (TDMA) communication systems and, more specifically, to TDMA communication systems with asymmetrical TDMA frame structures.

BACKGROUND OF THE INVENTION

Cellular telecommunications is one of the fastest growing and most demanding telecommunication applications ever. Today it represents a large and continuously increasing percentage of all new telephone subscriptions around the world.

In Europe and in North America, there are several large analog cellular systems operating such as NMT (Nordic Mobile Telephone) in the Nordic countries, TACS (Total Access Communication System) in the United Kingdom, and AMPS (Advanced Mobile Phone System) in the United States. Quality, capacity and area of coverage vary widely, but demand has outstripped estimates almost universally. To address the capacity limitations of the existing analog cellular systems, many operators are migrating to digital cellular systems. Digital cellular systems are generally classified as either TDMA (Time Division Multiple Access), CDMA (Code Division Multiple Access), or hybrids thereof. TDMA systems, such as the pan-European GSM (Groupe Special Mobile, or Global System for Mobile communication) system and D-AMPS (Digital Advanced Mobile Phone System) in the United States, provide increased capacity by dividing each frequency band into time slots, multiple users being allocated a different timeslot on the same frequency. CDMA systems, on the other hand, provide increased capacity by allowing multiple users to operate simultaneously across the same frequency range through the use of orthogonal spreading codes. In the long-term perspective, cellular systems using some form of digital technology will become the universal way of communication.

TDMA systems, such as GSM and D-AMPS, are currently the most widely deployed digital cellular systems. In GSM, for example, each frequency is divided into 8 timeslots. As shown in FIG. 1, base station 100 broadcasts a signal on frequency F1 to mobile station 120a on timeslot 2 and to mobile station 120b on timeslot 5. Up to eight mobile stations may be accommodated on a single frequency. Signals transmitted from base station 100 to the mobile stations 120a, 120b, are called the downlink signals, or more simply, the downlink. For two-way communication, there must also be a corresponding set of frequencies and timeslots in the opposite direction which are called the uplink signals, or more simply, the uplink. Generally, TDMA systems employ a symmetrical frame format, that is, the TDMA frame structure (i.e., bandwidth, number of timeslots, data rates, etc.) is the same on the uplink as it is on the downlink.

Recently, there have been proposals to construct a mobile satellite communication system employing orbiting satellites in place of, or to supplement coverage from, terrestrial base stations. Generally, mobile satellite communication systems employ a satellite which is in low earth orbit (LEO), intermediate circular orbit (ICO), or geostationary earth orbit (GEO). A ground station serves as the gateway between the satellite and the public switched telephone system (PSTN), or a terrestrial cellular system. Ideally, the satellite functions as a "bent pipe", that is, the satellite is a transponder, relaying signals received from a mobile station down to a ground station and, similarly, relaying signals received from the ground station to the mobile station. Often, a frequency translation in the satellite is required as communications between the ground station and the satellite occur across a different frequency range (e.g. C-band, Ku-band) than do the communications between the satellite and the mobile stations (e.g. L-band). It is generally desirable to design the system such that the satellite has a simple architecture.

TDMA may be used to increase the capacity of communications between the satellite and the mobile stations. As mentioned, TDMA formats are generally symmetrical, that is, the uplink and the downlink have the same TDMA timeslot structure. However, for reasons of performance, the uplink TDMA structure could be different than that of the downlink TDMA structure, that is, the bandwidth, number of timeslots, and data rates may differ significantly between the uplink and downlink.

Where mobile station to mobile station communications are required, passing through the ground station to effect the mapping between asymmetric TDMA formats results in unacceptable time delays. Normally, in an ICO system, the time delay experienced in a connection between the PSTN, or terrestrial cellular network, and a mobile station in communication with the satellite is on the order of 400 milliseconds, which is perceptible to the users, but not quite a hinderance to normal conversation. Where a link between two mobile stations is effected through the ground station, the delay can be as much as 1.2 seconds which results in a unacceptable hinderance to normal conversation.

SUMMARY OF THE INVENTION

The aforementioned problem of reducing the time delay in a mobile satellite communications system is solved in accordance with the present invention.

A method is presented in which a satellite is conditioned to map uplink signals having a first TDMA format which are received from a mobile station to downlink signals having a second TDMA format for transmission to another mobile station.

A first mobile station transmits a first signal to a satellite, the first signal having a first TDMA format. The satellite receives the first signal and downconverts the first signal to produce a first IF signal having a first bandwidth, BW. The first IF signal is sampled by an analog to digital converter at a rate of N×BW where N is an integer greater than or equal to 2 to produce an input bitstream. The input bit stream is coupled to a buffer which receives and stores the input bit stream. The buffer clocks a bit stream out at a rate M×N× BW, where M is an integer value greater than 1 to produce an output bitstream with a bandwidth equal to M×BW and a second TDMA format. The output bitstream is coupled to a low pass filter, upconverted and rebroadcast as a second signal, having a second TDMA format, to a second mobile station.

According to another exemplary embodiment of the invention, a method for supporting calls between two mobile stations within a satellite communication system is disclosed. First, when signals transmitted by a first mobile station using a narrowband transmission format are received at a satellite relay station, the received signals are sampled and digitized. The sampled and digitized signals are then stored in a buffer at a first rate. The stored data is then read out of the buffer at a faster rate than the first rate and modulated onto a downlink frequency to create a wideband transmission format. The modulated signals are then transmitted to the second mobile station.

According to still another exemplary embodiment of the invention, a satellite transponder for supporting calls between two mobile stations within a satellite communications system is disclosed. The transponder comprises a receiving device for receiving signals from a first transmission format. The received signals are sampled and digitized in sampling and digitizing devices and stored in a buffer at a first rate. The stored signals are then read out of the buffer at a faster rate than the first rate and are modulated in a modulating means onto a downlink frequency to create a wideband transmission format. A transmitting device then transmits the modulated signals to a second mobile station.

The above described and other features and advantages of the present invention will be readily apparent to one of ordinary skill in the art from the following written description when read in conjunction with the drawings in which like reference numerals refer to like elements.

BRIEF DESCRIPTION OF THE DRAWINGS

An exemplifying embodiment of the invention will now be described in more detail with reference to the accompanying drawings, in which:

FIGS. 9a–b illustrate exemplary components for providing direct mobile-to mobile transponding according to exemplary embodiments of the invention.

DETAILED DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 2:
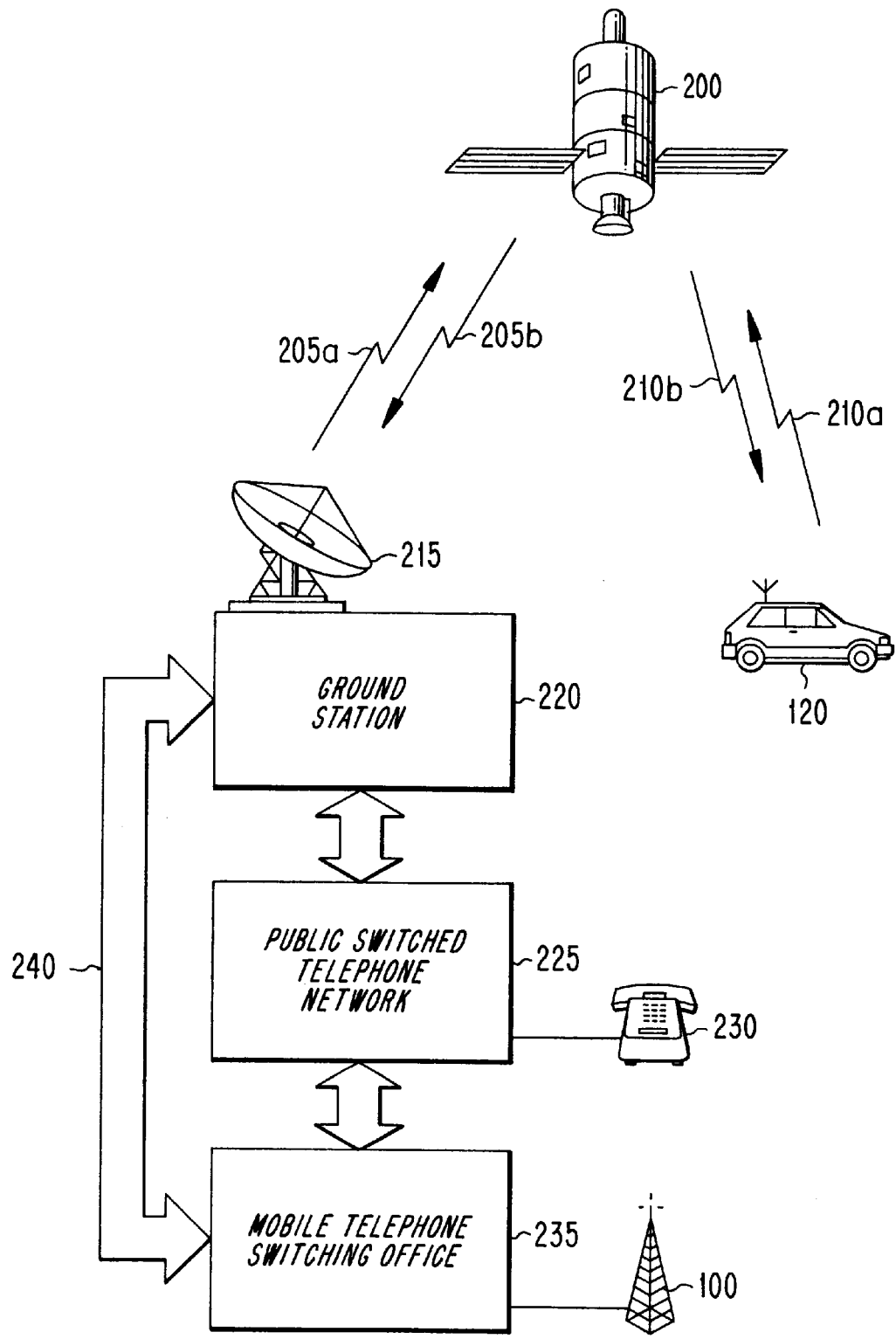
FIG. 2 illustrates a mobile satellite communication system in which the present invention may be advantageously employed.

In FIG. 2 is shown a mobile satellite communications system. In the present invention, satellite 200 is situated in an intermediate circular orbit (ICO) (i.e., approximately 10,000 kilometers above the earth.) Feeder links 205a and 205b are transmitted to, or received from, satellite 200 via dish antenna 215 which is part of ground station 220. Ground station 220 functions as a gateway between satellite 200 and the public switched telephone network (PSTN) 225, or mobile telephone switching office (MTSO) 235. Access to MTSO 235 may be effected through PSTN 225 or directly to ground station 220 through a dedicated link 240. PSTN 225 routes calls to the landline telephone network in the usual manner and calls to cellular telephones are effected through MTSO 235 in the usual manner.

Satellite 200 is intended to provide coverage to mobile users 120 who are located beyond the coverage area of the terrestrial cellular network 100. Mobile station 120 may be a car-mounted cellular telephone as shown in FIG. 2, a hand-held cellular telephone, a wireless modem installed in a laptop computer, or generally any radio communications device.

In the following, telephone calls, communication links, calls, data links, links and conversations, all refer to the establishment of a communications link over which voice, data, video, or any other information may be exchanged. The originator of a call refers to the device from which a call is initiated, and the receiver of a call refers to the device with which the originator wishes to communicate. With regard to the flow of information during a call, the forward uplink refers to the uplink to the satellite from the originator of the call; the forward downlink refers to the downlink from the satellite to the receiver of the call; the reverse uplink refers to the uplink back to the satellite from the receiver of the call; and reverse downlink refers to the downlink from the satellite back to the originator of the call.

Figure 3:
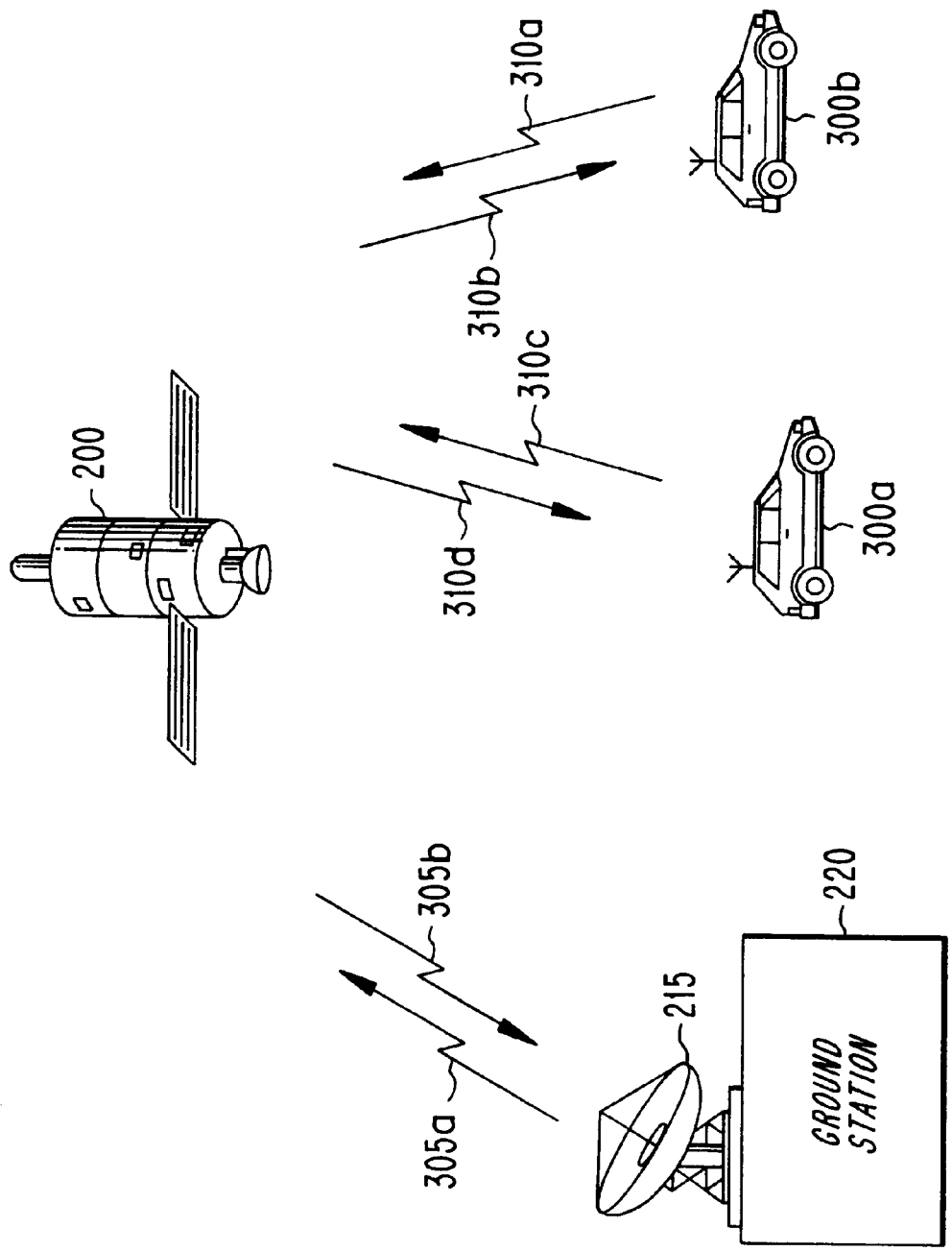
FIG. 3 illustrates a mobile station-to-mobile station communications link in a mobile satellite communications system.

Telephone calls which originate from PSTN 225 or MTSO 235 are routed to ground station 220 where they are processed and subsequently transmitted to satellite 200 via forward uplink 205a according to known techniques. Satellite 200 receives forward uplink 205a and frequency translates the forward uplink to another frequency/format which is then transmitted to mobile station 120 over forward downlink 210b. Frequency translation is usually required because the forward uplink and forward downlink usually operate in different frequency ranges. In this embodiment, for example, forward uplink 205a is transmitted to satellite 200 in C-band; forward downlink 210b is transmitted from satellite 200 in L-band; reverse uplink 210a is transmitted from mobile station 120 in L-band; and reverse downlink 205b is transmitted from satellite 200 in C-band. Signals transmitted from mobile station 120 over reverse uplink 210a are received by satellite 200 which, as before, frequency translates and re-formats the reverse uplink signal for transmission to ground station 200 over reverse downlink 205b. With an ICO satellite, the propagation delay between ground station 220 and mobile station 120 (and vice-versa) is on the order of 400 milliseconds. It is obvious to one skilled in the art that a mobile satellite communications system as illustrated in FIG. 3 may comprise several ground stations 220, more than one satellite 200, and hundreds, or thousands, of mobile stations 120.

Figure 1:
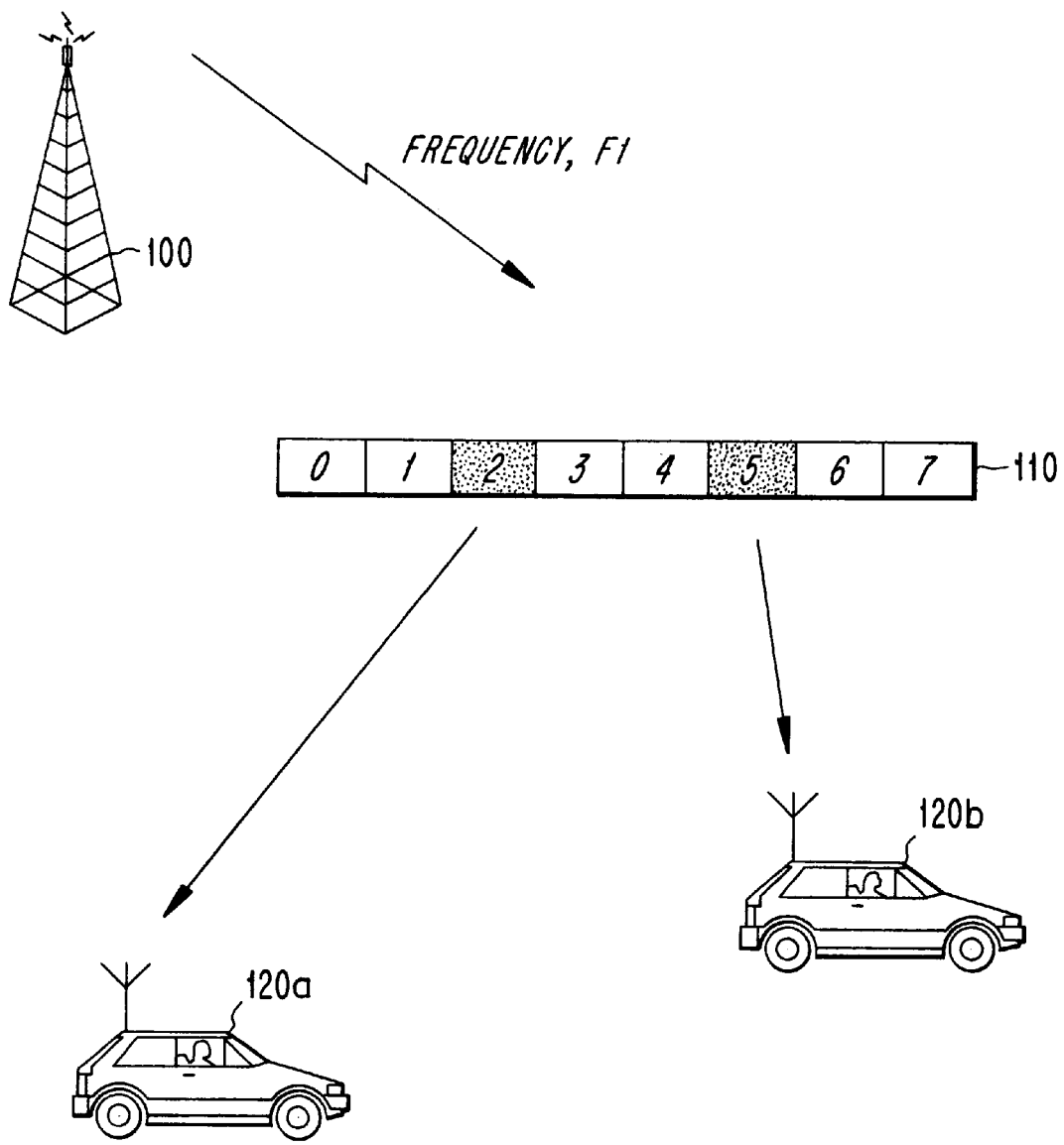
FIG. 1 illustrates the downlink of a terrestrial TDMA cellular communications system.

The mobile satellite communications system may employ a TDMA format similar to that shown in FIG. 1. Indeed, so that existing hardware may be re-used, it is advantageous to employ a TDMA format which is compatible with existing digital cellular systems. Use of a GSM format, for example, on the forward downlink 210b allows mobile station 120 to re-use the existing IF (intermediate frequency) receiver circuits and A/D (analog to digital) converters with minor modification for communication with satellite 200. For the present invention, a GSM format with 200 kHz channel spacings and 32 or 16 timeslots per TDMA frame is employed. By having a variable timeslot architecture, the forward downlink 210b can accommodate two different speech coder rates (i.e., 4 kbps, or half-rate GSM), or alternatively two different channel coding rates (i.e., 1/3, or 2/3).

On the reverse uplink 210a, use of the downlink TDMA format is precluded due to peak transmit power limitations of mobile stations, particularly battery-operated, hand-held mobile stations. For reasons of user safety and to prolong battery life, the peak power transmitted on reverse uplink 210a is desired to be less than 2 Watts with an average power of approximately 250 milliwatts to 500 milliwatts. With a peak power of 2 Watts, the duty cycle needed to achieve the aforementioned average powers is easily calculated to be 0.125 to 0.25 respectively which results in an 8/4 timeslot TDMA frame structure. Therefore, an asymmetrical TDMA format is advantageously used in the present invention. To assist in synchronization between forward downlink 210b and reverse uplink 210a, and to keep the overall system complexity as low as possible, the bandwidth of the reverse uplink 210a is an integer fraction of the bandwidth of the forward downlink 210b. The present invention therefore employs a 50 kHz bandwidth on the reverse uplink 210a. In the following, the downlink TDMA format refers to 200 kHz channels spacings having a 32/16 timeslot TDMA frame, whereas the uplink TDMA format refers to 50 kHz channel spacings having a 8/4 timeslot TDMA frame.

In addition to calls originating from, or terminating in, PSTN 225 or MTSO 235, the mobile satellite communication system must also be able to provide mobile station-to-mobile station communications. One method of providing mobile station-to-mobile station communication in a mobile satellite communication system using an asymmetrical TDMA format requires use of ground station 220 to perform the mapping from the uplink TDMA format to the downlink TDMA format. For example, referring to FIG. 3, if mobile station 300b is the originator and mobile station 300a the receiver of a call, mobile station 300b transmits over forward uplink 310a using the uplink TDMA format. Satellite 200 frequency translates forward uplink 310a and broadcasts forward downlink 305b. Forward downlink 305b is received by ground station 220 where the uplink TDMA format is mapped to the downlink TDMA format and broadcast back to satellite 200 over reverse uplink 305a. Satellite 200 frequency translates the reverse uplink 305a and broadcasts reverse downlink 310d to mobile station 300a using the downlink TDMA format. The cumulative propagation delay between mobile station—to satellite—to ground station—back to satellite—and down to mobile station may be as much as 1 second including the processing and propagation delays through ground station 220. Such a lengthy delay is unacceptable for two way voice communication.

Figure 4:
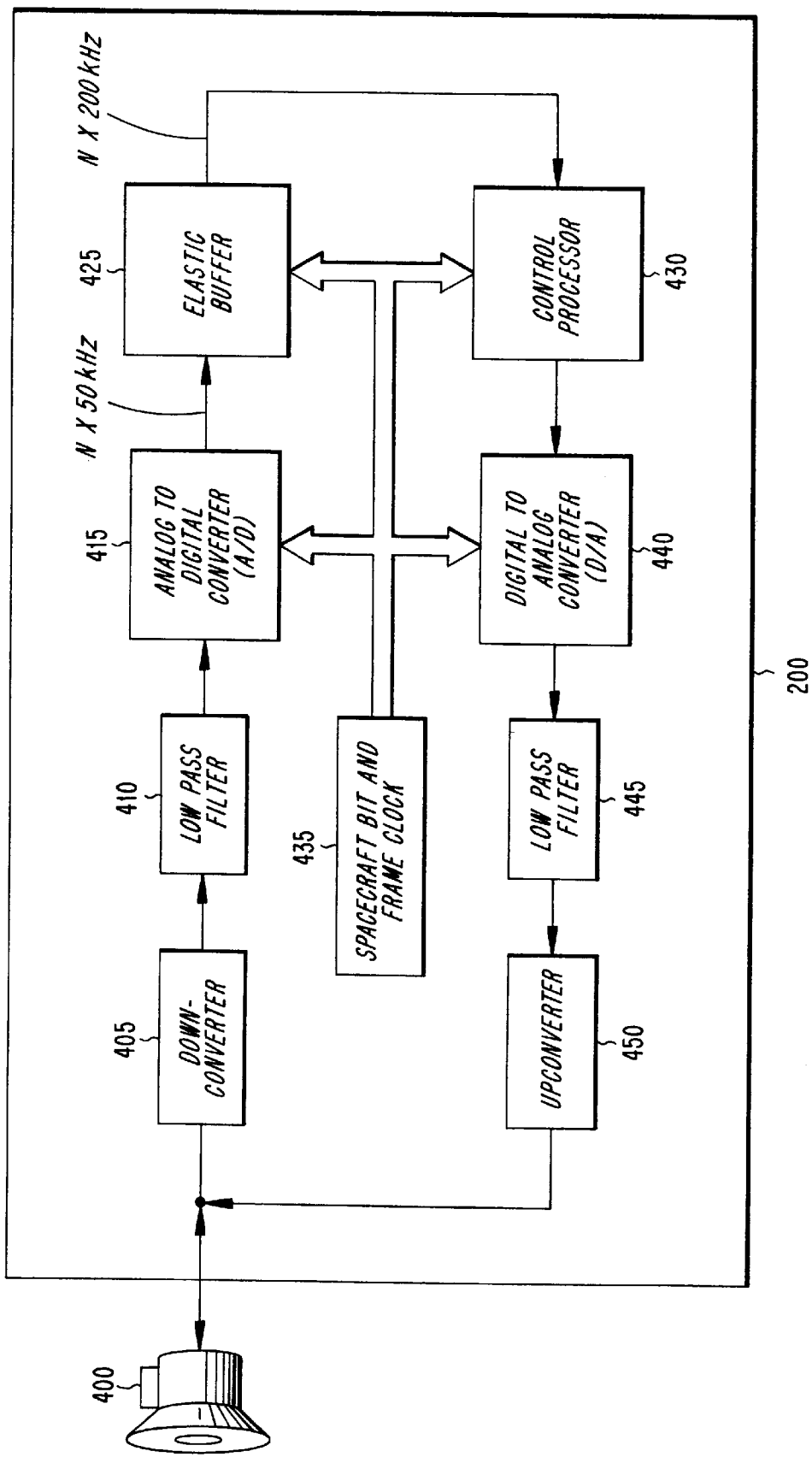
FIG. 4 is a block diagram of satellite illustrating in detail the circuits for converting a first TDMA format to a second TDMA format.

In the present invention, the mapping from the uplink TDMA format to the downlink TDMA format is performed in satellite 200. For example, if mobile station 300b is the originator and mobile station 300a the receiver of a call, mobile station 300b broadcasts forward uplink 310a using the uplink TDMA format to satellite 200; satellite 200 processes the forward uplink signal as shown in FIG. 4 which converts the uplink TDMA format to the downlink TDMA format and broadcasts forward downlink 310d using the downlink TDMA format to mobile station 300a. Similarly, mobile station 300a broadcasts reverse uplink 310c using the uplink TDMA format to satellite 200, satellite 200 processes the reverse uplink as shown in FIG. 4 which converts the uplink TDMA format to the downlink TDMA format and broadcasts reverse downlink 310b using the downlink TDMA format to mobile station 300b. By mapping the uplink TDMA format to the downlink TDMA format in satellite 200, the round trip delay can be more than cut in half over the aforementioned method of providing mobile station-to-mobile station communications via ground station 220.

The apparatus for mapping the uplink TDMA format to the downlink TDMA format is shown in FIG. 4 which is a more detailed illustration of satellite 200. Satellite 200 comprises, inter alia, antenna 400 which, in this example is an L-band antenna, and processing circuitry for effecting the conversion from uplink TDMA format to downlink TDMA format. Satellite 200 may also have a separate C-band antenna (not shown) for communicating the ground station 220, attitude control circuitry (not shown), solar panels and/or batteries (not shown), and various other spacecraft management circuits.

Referring to the mobile station-to-mobile station communications link shown in FIG. 3 where mobile station 300b is the originator and mobile station 300a the receiver of a call, forward uplink 310a is received at satellite 200 by antenna 400. Forward uplink is, as previously mentioned, an L-band signal having 50 kHz (i.e., BW is 50 kHz) channel spacing and 8/4 timeslots. Referring to FIG. 4, the received forward uplink signal is coupled to downconverter 405 which filters, amplifies, and mixes the received signal to produce a first IF signal according to known techniques. The first IF signal is passed through a 50 kHz anti-aliasing low-pass filter 410 and coupled to A/D converter 415 where the first IF is sampled at a sampling rate of N×BW. Preferably, the integer N is greater than 2, so the first IF is being oversampled. The IF samples are coupled to elastic buffer 425 which may be a shift register. The IF samples are then clocked out of elastic buffer 425 as output samples at rate of N×M×BW, where M is an integer. In the present embodiment M=4, which is the ratio between the uplink TDMA format (8/4 timeslots) and the downlink TDMA format (32/16 timeslots). The output samples are coupled to control processor 430 which may add additional overhead bits to the output bit stream to produce the downlink bit stream. The downlink bitstream is coupled to A/D converter 440 and low pass filtered in low pass filter 445 which produces an analog downlink signal. The analog downlink signal is upconverted to L-band in upconverter 450 according to known techniques and broadcast as the forward downlink 310d to mobile station 300a.

Figure 5:
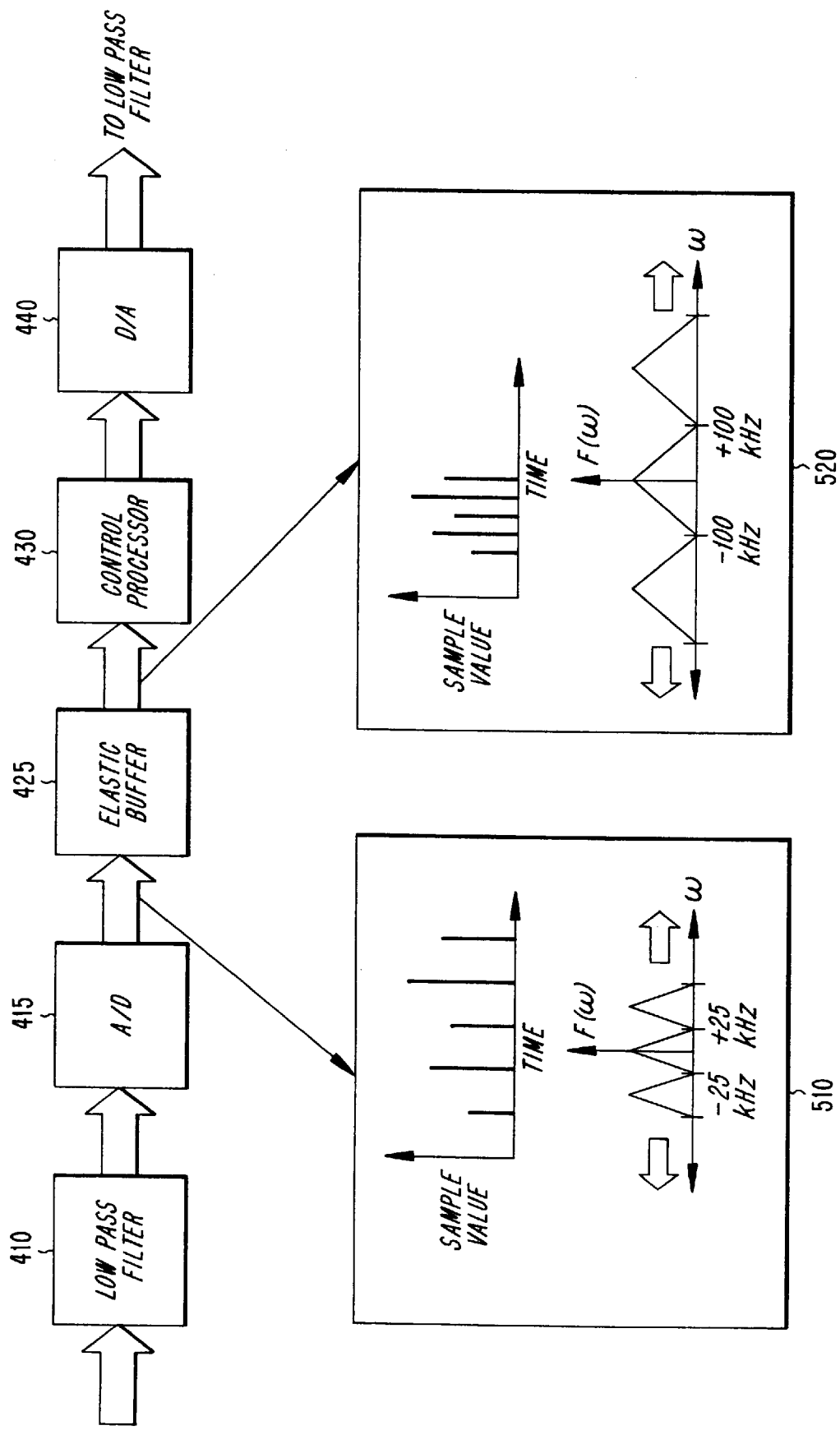
FIG. 5 is a block diagram illustrating in greater detail the function of an exemplary elastic buffer according to the invention.

The function of elastic buffer 425 is illustrated in greater detail in FIG. 5. After downconversion in downconverter 405, the 50 kHz signal is coupled to anti-aliasing low pass filter 410 whose output is coupled to A/D converter 415. A/D converter samples the 50 kHz signal at N×50 kHz, where N is greater than or equal to 2. The time and frequency spectrum of the output of A/D converter 415 is shown in illustration 510. Elastic buffer, which may be a simple shift register, receives the output samples which are stored and clocked out at, for example, 4 times the rate of the input (i.e., M=4). The time and frequency spectrum of the output of elastic buffer, shown in illustration 520, is coupled to control processor 430. The control processor allows satellite 200 to add additional information to bitstream such as SACCH messages. The output of control processor 430 is coupled to D/A converter 440, low pass filtered, upconverted, and broadcast by antenna 400. The use of a shift register, or elastic buffer 425, allows satellite 200 to map the uplink TDMA format to the downlink TDMA format without demodulating and re-modulating.

Figure 6:
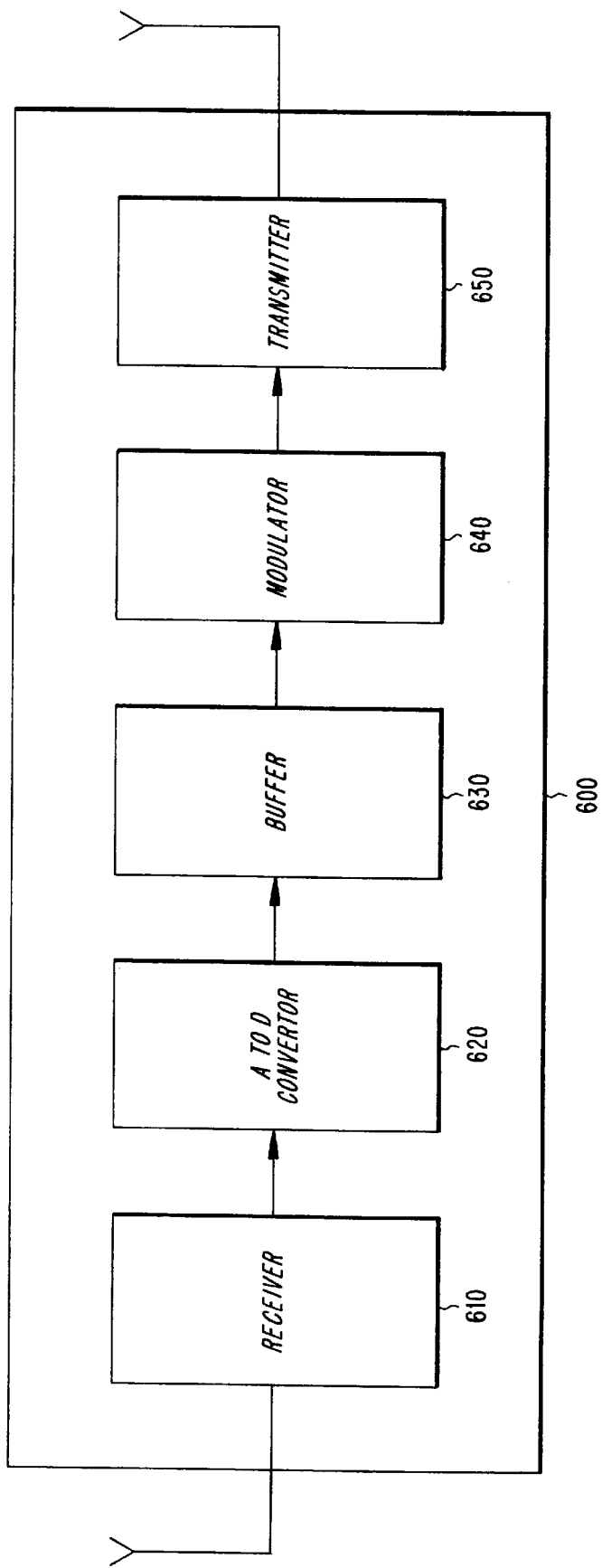
FIG. 6 illustrates an exemplary satellite transponder according to one embodiment of the present invention.

According to one embodiment of the present invention, mobile-to-mobile calls can be directly relayed through a satellite relay station without using ground based hub-stations in order to avoid delay and external tariffs. A satellite transponder 600 according this embodiment of the present invention is illustrated in FIG. 6. Signals transmitted by one of the mobile stations for the other mobile station are received at the satellite in receiver 610. The received signals are then sampled and digitized in an A to D convertor 620 and stored in a buffer 630 at a first rate. The stored signals can then be read out of the buffer 630 at a faster rate and modulated in a modulator 640 onto a downlink frequency to crate a wideband transmission format.

The sampling and digitization of uplink signals takes place in any case on board the satellite whenever the transponder is of the type known as a digital processing payload. Such a transponder may digitize the whole uplink bandwidth in order to subsequently use digital filters or a Fast Fourier transform technique to divide the bandwidth into sub-bands or all the way down to individual uplink channel frequencies. The transponder may use digitized signals also to affect digital beamforming as for example described in U.S. patent application Ser. No. 08/568,664, entitled "Efficient Apparatus for Simultaneous Modulation and Digital Beamforming for an Antenna Array" and filed Dec. 7, 1995, now pending which is incorporated herein in its entirety by reference. To form a mobile-to-mobile transponder according to the invention, digital bandsplitting and optionally digital beamforming is employed to split out one or more narrowband uplink channels for receiving mobile signals destined to be relayed directly to other mobiles. However, such directly relayed signals are preferably also relayed to the HUB station which continues to have responsibility for commanding the mobile transmitters to adjust their power or timing and to accumulate tariffs to be charged to the subscribers for using the system.

When such digital processing payloads are used as described above, received signals from mobile stations are digitized using any of the aforementioned techniques described in incorporated references and are processed in a processor comprising memory elements and arithmetic elements. The HUB station provides a synchronization signal on the C- or K-band feederlink to determine, when the satellite mobile-to-mobile processing elements, an uplink frame period and timeslot timing (if TDMA is used on the uplink) during which samples from a mobile terminal will be digitized, processed and collected in the processor memory. The number of samples collected per frame in the processor memory will correspond to one uplink timeslot of signal duration. The HUB station will also monitor signals received from the mobiles relayed via the C- or K-band feederlink and issue timing adjustment commands if necessary, to control the mobile transmit timing such that signals are received at the satellite properly aligned in the determined timeslot.

The collected timeslot's worth of mobile uplink transmission is then read out of the memory according to a higher frequency clock and translated to a satellite-to-mobile downlink frequency by the downlink processing, beamforming and satellite transponder devices such that it is transmitted in a downlink timeslot associated with the uplink channel and timeslot according to the principles of the above incorporated parent application Ser. No. 08/179,954, now U.S. Pat. No. 5,539,730, for associating a channel and timeslot of one TDMA format (e.g. narrowband TDMA) with a channel and timeslot of a different (e.g. wideband) TDMA format. A time compression of the relayed signal is thereby effected. The signal's bit allocation within the TDMA burst is not affected, nor is the nature of the modulation effected by this time compression, only a scaling of time and bandwidth such that the relayed signal now matches the signal bandwidth and timeslot duration to which the mobile receivers are optimized. If necessary, a mobile that is allocated a direct mobile-to-mobile transponder channel changes the allocation of bits within the uplink burst as compared to the bit allocation that would be used for communication with the PSTN or via the HUB station. For example, U.S. Pat. No. 5,557,645, entitled "Channel Independent Equalizer Device" and issued Sep. 17, 1996 in the name of Dent, which is incorporated herein in its entirety by reference, describes the advantages of using distributed pilot symbols together with a particular bit interleaving strategy for efficient communication over narrowband channels. However, the mobile receiver receives a wideband channel and processes only a short timeslot over which signal changes due to fading are negligible. In the wideband channel case, it can be more desirable to use non-distributed or "clumped" pilot symbols in the form of a known "syncword" that is centrally placed within the downlink timeslot. Accordingly, the mobile uplink transmission is changed to adopt the pilot symbol and interleaving bit placements of the downlink format, whenever a direct mobile-to-mobile channel is allocated.

An exemplary format for satellite communications with dual-mode phones that operate in either the satellite system or the GSM land-based cellular system uses a satellite downlink with the same 200 KHz channelization as GSM and a TDMA format that has the same burst duration and symbol rate as GSM, but a frame period that is either twice as long or four times as long as the GSM "full-rate" frame period, and therefore has either 16 or 32 timeslots compared to GSM's eight. In the uplink direction, the preferred format transmitted by the mobile terminal is a more narrowband format using 50 KHz channelization and correspondingly fewer timeslots (four or eight), in order to reduce the peak-to-average power ratio of mobile transmissions. In the uplink direction, the burst duration is chosen to be four times a GSM burst duration with exactly ¼ the symbol rate, which format is easily created by the mobile transmitter using the components existing for the GSM cellular mode. The inventive format is described in more detail in U.S. patent application Ser. No. 08/816,054, entitled "Dual Mode Satellite/Cellular Terminal" and filed Mar. 11, 1997 in the name of Dent, which is incorporated herein in its entirety by reference.

The exemplary format includes a superframe structure comprising a repeated pattern of twelve, 16-slot TDMA frames plus a 13th frame that contains Slow Associated Control Channel information (SACCH). The SACCH slots contain messages from the HUB to the mobiles enabling the HUB station to command mobiles inter alia to adjust their power or transmit timing. When a mobile terminal is connected directly to another mobile terminal using the inventive time-compressing transponder disclosed herein, it is appropriate for the SACCH commands to continue to be sent from the HUB to the mobile terminals in question rather than to require that one mobile have the ability to generate commands for another. Moreover, if two mobiles in direct connection attempted to control each other's transmit timing, their absolute timing would not be controlled to any system reference and would drift in an uncontrolled manner, risking timing clashes with other mobiles using other timeslots on the same frequencies. This is avoided by using the inventive time-compressive transponder to replace the samples in every 13th timeslot relayed to a mobile terminal with SACCH signal samples received from the HUB station via the C- or K-band feederlink. The uplink SACCH bursts received at the satellite from the mobile terminals continue to be relayed to the HUB station such that a two-way SACCH message channel between each mobile station and its controlling HUB station is maintained even in the direct mobile-to-mobile communications mode. The HUB-originated SACCH slots thus provide the mobile stations with an absolute time reference relative to which the mobile station times its transmissions, avoiding the aforementioned drift problem. Timing is also maintained during periods of voice silence when the voice traffic slots are not transmitted in order to save satellite or mobile terminal battery power. Transmitting periodic signal bursts in order to maintain synchronization through periods of Discontinuous Transmission (DTX) is described in U.S. Pat. No. 5,239,557, entitled "Discontinuous CDMA Reception" and issued Aug. 24, 1993 in the name of Dent, which is incorporated herein in its entirety by reference.

Thus, the mobile-to-mobile transponder preferably includes the steps of receiving narrowband signals from mobile stations and relaying them to HUB stations; digitizing some of the received narrowband signals and time compressing them for transmission back to other mobile stations in a wideband format; and multiplexing time-compressed signals into a wideband downlink TDMA format along with other signals received from the HUB station already in wideband format, such as SACCH messages destined for said mobile stations or voice or data traffic for PSTN-to-mobile calls. The multiplexed signals form a downlink TDMA signal structure which is then modulated onto a downlink carrier frequency. The modulated signals are then transmitted by a transmitter to the second mobile station. Thus, by buffering the received signals and reading the signals out of the buffer at a faster rate, it is possible to support mobile-to-mobile calls through a satellite relay station without having to significantly increase the complexity of either the satellite relay station or the mobile stations. The downlink power level is increased for mobile-to-mobile calls to compensate for double-path radio noise, since the uplink noise was not removed by error correction decoding on board the satellite.

Figure 7:
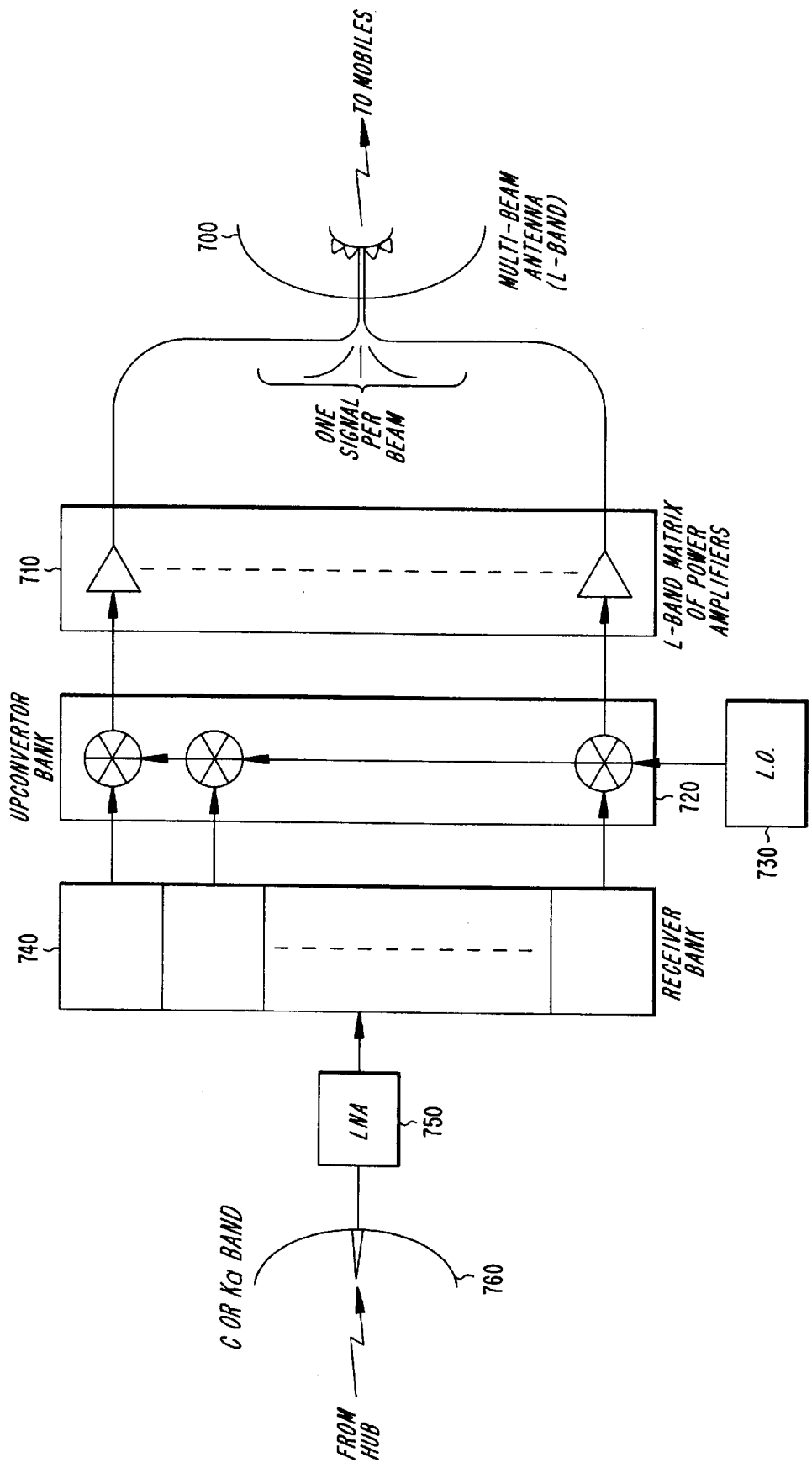
FIG. 7 illustrates an exemplary hub-to-mobile satellite transponder.
Figure 8:
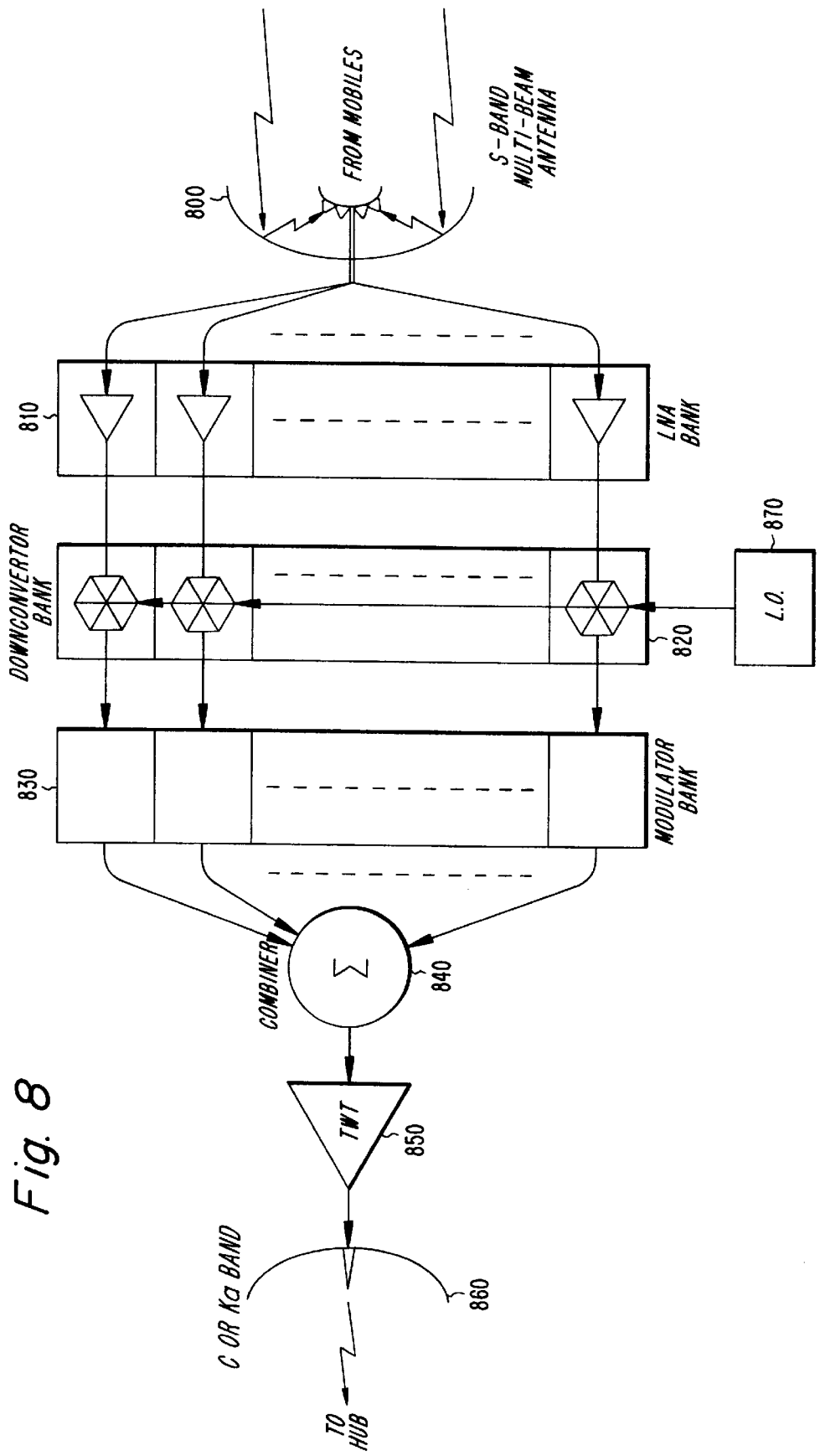
FIG. 8 illustrates a mobile-to-hub satellite transponder.

FIGS. 7 and 8 illustrate a satellite communications payload suitable for one embodiment of the present invention. FIG. 7 illustrates the downlink to the mobile phones while FIG. 8 illustrates the uplink from the mobile phones. Referring now to FIG. 7, an antenna 760 receives a number of signals from the HUB which are demodulated or coherently downconverted using a bank of receivers 740. The receiver output signals are then coherently upconverted in a bank of upconvertors 720 by mixing with a common local oscillator 730. The upconverted signals are now at the downlink frequency and are amplified by a bank of power amplifiers 710, wherein each amplifier is coupled to one element, a group of elements, or a feed of a multi-beam antenna or phased array. In one embodiment of the present invention, the amplifiers are class C transmit power amplifiers operated at maximum efficiency. In one embodiment of the present invention, the satellite transmitter comprises saturated travelling wave tubes. The HUB is thus able by sending appropriate signals to the satellite antenna 760 to determine what signals will be broadcast by a multi-beam antenna 700 at what time and in what direction. In this manner, it can be determined, for example, that in any particular time slot of the down TDM format only a subset of regions of the earth receive the signals, the regions being sufficiently separated in boresight angle so that they do not suffer interference from one region to another. In this way, independent signals can be sent to one phone in each region in each timeslot without interference. In the next timeslot, a different set of regions, i.e., those in between the first set of regions, are illuminated so that all regions receive the signal from some timeslots in the frame. U.S. Pat. No. 5,619,503, entitled "A Cellular/Satellite Communication System With Improved Frequency Re-use" and issued Apr. 8, 1997 in the name of Dent, which is incorporated herein in its entirety by reference, discloses how one to one re-use can be used for the present embodiment wherein every timeslot is used in all of a number of sub-regions.

When the system is operating at less than full capacity, not all of the timeslots in the frame will be active. Moreover, one half of a two party conversation is generally silent at any time so that an advantage can be gained by turning off the signal in the corresponding timeslot momentarily. When the number of timeslots is large, i.e., 512, it is statistically accurate to assume that only approximately 50% will be active at the same time. The power amplifiers 710 are arranged to draw little or no current during inactive or unallocated timeslots so that the mean consumption from the satellite prime power supply corresponds, even when fully loaded, to only half the power amplifier peak power consumption. For a given size solar array, the power amplifier peak power can thus be dimensioned to twice the value which the solar array otherwise would support.

Furthermore, peak capacity is reached only at certain times of the day, whereas the solar array converts the sun's energy into electrical power during a full 24 hour period. By using a rechargeable battery to average the power consumption in 24 hours, a further factor increase in peak transmitter power can be made relative to the continuous load the solar array can support. An advantage of TDM downlink used in the present invention is that current consumption reduces in direct proportion to the under-utilization factor, in contrast with an FDMA or CDMA downlink which use power amplifiers which only reduce their current consumption by the square root of the under-utilization factor, if at all. Therefore, using a TDM downlink allows the full benefit to be taken of the average under-utilization factor.

The active time slots of any TDM signal may be packed together to occupy adjacent time slots in a subframe period which is a portion of the TDM frame period. The inactive time slots form the rest of the TDM frame period. The subframe of any TDM signal retransmitted in one of the multiple satellite antenna beams does not overlap the subframes of the TDM signals transmitted in the neighboring beams.

Referring now to FIG. 8, a multi-beam antenna or multi-element phased array 800 receives signals on the uplink frequency from a plurality of mobiles. Mobiles in the same region of the earth use different FDMA channel frequencies on the uplink and according to the invention do not transmit during their received timeslots on the TDM downlink. Mobiles in a different region of the earth use the same set of frequencies as mobiles in the first region, therefore the antenna 800 receives a plurality of signals on each FDMA channel that arrive from different directions. In the case of a multi-beam antenna such as a parabola with spaced feeds, the different directions correspond to different beams so that signals on the same frequency appear in different beams and can thus be separated. This may require that adjacent beams do not contain the same frequencies, but that an adequate re-use factor is employed such as the three to one frequency re-use pattern illustrated in the above incorporated parent application Ser. No. 08/581,110. When uplink FDMA channels are associated with corresponding downlink TDMA timeslots, the use of a three-to-one time re-use pattern on the downlink as disclosed above automatically gives rise to a three-to-one frequency re-use pattern on the uplink, thus achieving separation of signals. On the other hand, a one-to-one re-use frequency pattern can be achieved for the uplink using the configuration of FIG. 7 particularly when antenna 800 is a phased array.

The antenna 800, whether a multi-feed parabola or multi-element phased array, presents a number of RF ports containing a plurality of mobile uplink signals. A bank of low noise amplifiers 810 and downconvertors 820 amplify these signals and coherently downconverts them using a common local oscillator 470 to a suitable intermediate frequency for amplification and filtering. The downconverted filtered and amplified signals are then applied to a bank of upconvertors or transmitter modulators 830 which translate the signals to the C or Ka bank while preserving their phase relationships before adding them in a combiner 840 and amplifying them in a traveling wave tube TWT power amplifier 850 for transmission to the HUB station through an antenna 860. It should be noted that the antenna 860 in FIG. 8 may be the same as the antenna 760 in FIG. 7, the C/Ka bank receiver then being separated from the transmitter by means of a duplex filter. Moreover, both polarizations may be used in both directions in order to increase bandwidth utilization. Each polarization would then have associated with it half of the receiver bank 740 and half of the transmitter bank 830 connected to a separate traveling wave tube. Furthermore, a downlink antenna 700 and the uplink antenna 800 can also in principle be one and the same with the addition of transmit/receive duplexing filters for each beam, array element or subarray, thus achieving double use of the same antenna aperture.

A description of the corresponding HUB station equipment may be found in the above incorporated U.S. Pat. No. 5,619,503, entitled "A Cellular/Satellite Communication System With Improved Frequency Re-use" and issued Apr. 8, 1997 in the name of Dent.

To give the satellite transponder the ability to relay mobile-to-mobile calls directly, some processing on board the satellite in addition to that illustrated in FIGS. 7 and 8 is provided. FIGS. 7 and 8 represent the simplest and most flexible form of multi-beam satellite transponder, which operates by relaying everything received by every satellite receive antenna element to the HUB station for processing. When the receive antenna is a multi-element phased array for example, the combination of element signals to form a directive beam is done at the HUB station, and not on board the satellite, the signals not even needing to be digitized on board the satellite. For selecting a mobile signal on board the satellite for direct relay to another mobile terminal, the directivity must however be formed on board. It is also necessary to select out the narrowband uplink channel or channels that contain mobile transmissions to be transponded directly to other mobiles. If the satellite receive antenna forms its directivity by means of a parabolic reflector having multiple feedpoints for different receive beams, digital beamforming may not be required. It is also possible to provide a number of narrowband receiver channels using analog filter hardware that can be switched to connect to selected beams or tuned to select different channels under telecommand from the HUB station.

Alternatively, the satellite receive antenna may be a phased array and the array element signals then have to be combined on board the satellite in order to form directive receive beams. This is facilitated by digitizing the element signals and submitting them to a digital beamformer for processing using a number of beamforming coefficients. The coefficients can also be received by telecommand from the HUB station, where the coefficients can be adapted to maximize signal-to-noise-plus-interference ratios according to the method described in the above incorporated U.S. Pat. No. 5,619,503. When such digitization and digital processing shall exist for beamforming, it can be logical also to employ digital channelization which uses digital filters to restrict the bandwidth for selecting individual uplink channels.

FIGS. 9a–b show the addition of the inventive mobile-to-mobile channels to the transponder of FIGS. 7 and 8, for example. The transponder of FIGS. 7 and 8 is configured to support PSTN to mobile connections without digital processing on board the satellite. This can make use of the complex, analog time-multiplexed feederlink disclosed in U.S. Pat. No. 5,619,210, entitled "A Large Phased-Array Communications Satellite" and issued Apr. 8, 1997 in the name of Dent, and may have the capability to provide different beamwidths as disclosed in U.S. Pat. No. 5,642,358, entitled "Multiple Beamwidth Phased Array" and issued June 24, 1997 in the name of Dent, both of which patents are incorporated herein in their entireties by reference. Alternatively, the satellite transponder may be of the full, digital processing payload variety which performs on-board digital channelization and/or beamforming. With either form of PSTN-MOBILE transponder alignment, the objective of the additions required to form the inventive mobile-to-mobile transponder is to bleed off some uplink signals received from mobiles for filtering and time compression according to the inventive principles disclosed herein, and then to additively reinsert the time compressed signals for transmission to mobiles, multiplexed with other voice, data or SACCH signals received from the HUB via the feederlink receivers 740.

FIGS. 9a–b illustrate signals being received from mobile terminals using receive antenna elements connected to transponder 900, which can be in one embodiment the same as shown in FIG. 8. In addition to transponding the receive element signals to the HUB station via the feederlink the received element signal are, after amplification and downconversion also fed to digital processing unit 901 which performs analog-to-digital conversion, digital channel filtering to split out selected uplink channel frequencies, and digital beamforming (if sufficient spatial selectively is not already provided by the antenna design). Digital beamforming and digital channelization can be performed in either order. Digital channelization is performed first in the case where different sets of beam directions shall be formed for different uplink frequencies, followed by per-frequency beamforming using different beamforming coefficient sets for each frequency. Digital beamforming may be performed first when the beam characteristics described are the same for all frequencies. It is also possible to have partial beamforming for sub-bands before further channel splitting of the sub-bands into individual uplink channels, followed by further beamforming processing to define offset direction sets for each channel or timeslot.

The signals separated by channel frequency (channel K) and direction (beam i) are stored as samples in buffer memory 902 which is connected to digital processing unit 901. The samples corresponding to a desired uplink frequency and beam are selected by control and timing unit 903 which also selects samples in a desired uplink timeslot, the timing of which is referenced back to the HUB station by means of synchronization signals received from the HUB using feederlink receivers 740. Selected samples corresponding now to a first mobile signal occupying a particular uplink timeslot, a particular uplink carrier and a particular direction of arrival (beam) are passed to a corresponding mobile-mobile transmit beamformer 905 where they are processed to form antenna element signals that will create a directive transmit beam in a desired direction, i.e., towards a second mobile with which the first mobile is desirous to communicate. The samples are read out of transmit digital beamformer 905 at a time determined by timing control unit 903 such that they will be transmitted in an allocated downlink timeslot. Since downlink timeslots are shorter than uplink timeslots, the samples are read out of beamformer 905 and into D-to-A convertors 904 at a proportionally faster rate. Moreover, the complex samples can be accorded a progressive angular rotation corresponding to a desired frequency shift in order to assure that transmission occurs on a desired downlink carrier frequency, said frequency shift also optionally including precompensation of Doppler shift due to satellite motion to or from the destination mobile unit. The D-to-A converted, time-compressed and frequency shifted signals are added to other signals received from the HUB station by feederlink receivers 740, however, no signal will be received from the HUB in the timeslot and frequency channel allocated to the mobile-to-mobile downlink. The HUB station ensures this by not creating a corresponding feederlink signal at that instant. The HUB station may, however, via control and timing unit 903 inhibit particular timeslots received from a mobile, corresponding to its SACCH slots, from being selected from buffer memory 902, so that the SACCH slots will not be added in adders 906 and so will not be transponded from mobile-to-mobile. Instead, the HUB station fills in the downlink SACCH slot with SACCH information to be sent to the mobile.

The above describes how a single mobile signal is transponded to a second mobile. The hardware of FIG. 9 is capable of performing the same function simultaneously for the reciprocal direction, and for many different such pairs of mobile terminals in different beams or frequencies or timeslots to a total number equal to the provided processing capacity for direct mobile-to-mobile calls. Where insufficient capacity for direct mobile-to-mobile calls may temporarily exist, mobile terminals may still be connected to other mobile terminals by the normal double-hop method of transponding their signals to the HUB station or stations and after switching through a mobile switching exchange or the PSTN transponding them back to other mobiles via the satellite. This has the disadvantage of double propagation delay, which the invention has sought to overcome. Mobiles initially allocated a double-hop path due to temporary lack of direct mobile-to-mobile transponding capacity may, however, be queued for allocation of a lower delay direct mobile-to-mobile link as soon as one becomes available due to earlier calls terminating. This queuing function is performed by the switching computer in the ground network and a pair of mobiles are switched from double-hop to single-hop connection by the HUB station issuing a so-called "internal handover" command using the SACCH channel. An internal handover comprises sending a control message to the mobil informing it to change mode, channel or timeslot, and may be performed from time to time for other channel management reasons such as minimizing co-channel interference or avoiding timing clashes as is well described in the incorporated references, as well as for the purpose described above. It will be appreciated by those or ordinary skill in the art that the number of timeslots, frequency bands and applications mentioned above are primarily for the purpose of illustration and are not meant to imply any limitation of the present invention.

While the present invention has been described with respect to particular embodiments, those skilled in the art will recognize that the present invention is not limited to the specific embodiments described and illustrated herein. Different TDMA formats, embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

We claim:

1. In a mobile satellite communications system, a method for providing communications via a communications satellite relay station between a first mobile station conditioned to transmit a first signal having a first TDMA signal format and a first bandwidth and a second mobile station conditioned to receive a second signal having a second TDMA signal format, the method comprising:

receiving in the satellite relay station the first signal having the first TDMA signal format and the first bandwidth from the first mobile station;

sampling the received first signal at a first rate to produce a first bitstream having a first number of samples per second;

storing, in a buffer, the first bitstream;

clocking out of the buffer the first bitstream at a second rate, which is different from the first rate, to produce a second bitstream having a second number of samples per second which is different from the first number of samples per second of the first bitstream, the samples in both the first and second bitstreams being representative of the received first signal; and transmitting from the satellite relay station to the second mobile station the second bitstream as the second signal using the second TDMA format at a second bandwidth which is different from the first bandwidth of the first signal.

2. The method of claim 1, wherein the number of time slots in the first TDMA format and the second TDMA format may be varied with different frames.

3. A method according to claim 1, wherein the second bitstream is multiplexed with Slow Associated Control Channel (SACCH) information to provide the second signal using the second TDMA format.

4. A method according to claim 3, wherein the SACCH information is provided to the satellite relay station by a ground station in the mobile satellite communications system.

5. A communications satellite relay station for providing communications between a first mobile station conditioned to transmit a first signal having a first TDMA format and a first bandwidth and a second mobile station conditioned to receive a second signal having a second TDMA format, the satellite relay station comprising:

a receiver for receiving the first signal having the first TDMA signal format and the first bandwidth;

an analog to digital converter for sampling the received first signal at a first rate to produce a first bitstream having a first number of samples per second;

a buffer for receiving the first bitstream and clocking out the first bitstream at a second rate, which is different from the first rate, to produce a second bitstream having a second number of samples per second which is different from the first number of samples per second of the first bitstream, the samples in both the first and second bitstreams being representative of the received first signal; and a transmitter for transmitting the second bitstream as the second signal using the second TDMA format at a second bandwidth which is different from the first bandwidth of the first signal.

6. The satellite relay station of claim 5, where said buffer is a shift register.

7. The satellite relay station of claim 5, where said second TDMA format is a GSM format.

8. A satellite relay station according to claim 5, wherein the second bitstream is multiplexed with Slow Associated Control Channel (SACCH) information to provide the second signal using the second TDMA format.

9. A satellite relay station according to claim 8, wherein the SACCH information is provided to the satellite relay station by a ground station in the mobile satellite communications system.

10. In a mobile satellite communications system, a method for providing communications via a communications satellite relay station between a first mobile station conditioned to transmit a first signal having a first TDMA format and a first bandwidth BW and a second mobile station conditioned to receive a second signal having a second TDMA format, the method comprising:

receiving, in the satellite relay station the first signal having the first TDMA signal format and the first bandwidth BW from the first mobile station;

downconverting the first signal to a first IF signal;

sampling the first IF signal at a rate N×BW, where N is greater than or equal to 2, to produce a first bitstream having at least N×BW samples per second with the samples being representative of the received first signal;

storing, in a buffer, the first bitstream;

clocking out of the buffer the first bitstream at a rate M×N×BW, where M is greater than or equal to 2 to produce a second bitstream having at least M×N×BW samples per second with the samples being representative of the received first signal;

filtering the second bitstream to produce a second IF signal;

upconverting the second IF signal to produce an output signal;

formatting the output signal into the second TDMA format to produce the second signal; and transmitting the second signal from the satellite relay station to the second mobile station.

11. The method of claim 10, wherein the number of time slots in the first TDMA format and the second TDMA format may be varied with different frames.

12. The method of claim 10, wherein N, in the sampling rate of the first IF signal, is an integer.

13. The method of claim 10, wherein M, in the rate at which the first bitstream is clocked out of the buffer, is an integer.

14. A method according to claim 10, wherein the second bitstream is multiplexed with Slow Associated Control Channel (SACCH) information to provide the second signal using the second TDMA format.

15. A method according to claim 14, wherein the SACCH information is provided to the satellite relay station by a ground station in the mobile satellite communications system.

16. A method for supporting calls between two mobile stations within a satellite communication system, comprising the steps of:

transmitting signals from a first mobile station to a satellite relay station using a narrowband time division multiple access transmission format;

sampling and digitizing signals received from said first mobile station;

storing said sampled and digitized signals in a buffer means at a first rate;

reading out of said buffer means said stored signals at a faster rate than said first rate and modulating said stored signals onto a downlink frequency to create a wideband time division multiple access transmission format;

transmitting said modulated signals to a second mobile station;

receiving and decoding said modulated signals at said second mobile station.

17. A method according to claim 16, wherein the stored signals are multiplexed with Slow Associated Control Channel (SACCH) information to provide the wideband time division multiple access format.

18. A method according to claim 17, wherein the SACCH information is provided to the satellite relay station by a ground station in the satellite communication system.

19. A satellite transponder for supporting calls between two mobile stations within a satellite communication system, comprising:

receiving means for receiving signals being transmitted using a narrowband time division multiple access transmission format;

means for sampling and digitizing said received signals;

means for storing said sampled and digitized signals at a first rate;

means for reading out said stored signals at a faster rate than said first rate and modulating said stored signals onto a downlink frequency to create a wideband time division multiple access transmission format; and transmitting means for transmitting said modulated signals to a second mobile station.

20. A satellite transponder according to claim 19, wherein the stored signals are multiplexed with Slow Associated Control Channel (SACCH) information to provide the wideband time division multiple access format.

21. A satellite transponder according to claim 20, wherein the SACCH information is provided to the satellite transponder by a ground station in the satellite communication system.

22. A method for supporting calls between two mobile stations within a satellite communication system, comprising the steps of:

receiving narrow band time division multiple access (TDMA) signals from said mobile stations at a satellite relay station;

relaying the received narrowband TDMA signals to at least one ground station;

digitizing some of the received narrowband signals;

time compressing said digitized signals;

multiplexing said time compressed signals into a wideband TDMA downlink format along with other signals from said at least one ground station; and transmitting said multiplexed signals to one of said mobile stations.

23. A method according to claim 22, wherein said other signals from said at least one ground station are Slow Associated Control Channel Information (SACCH) signals.

24. A method according to claim 23, wherein said SACCH signals are computed based upon the received narrowband signals relayed to said at least one ground station.

25. A method according to claim 23, wherein said SACCH signals control transmit timing at said mobile stations.

26. A communications satellite relay station for providing communications between a first mobile station conditioned to transmit a first signal having a first TDMA format and a second mobile station conditioned to receive a second signal having a second TDMA format, the satellite relay station comprising:

a receiver for receiving the first signal having the first TDMA signal format and a first bandwidth BW and downconverting the first signal to a first IF signal;

an analog to digital converter for sampling the first IF signal at a rate N×BW, where N is greater than or equal to 2 to produce a first bitstream having at least N×BW samples per second with the samples being representative of the received first signal;

a buffer for receiving the first bitstream and clocking out the first bitstream at a rate M×N×BW, where M is greater than or equal to 2 to produce a second bitstream having at least M×N×BW samples per second with the samples being representative of the received first signal;

a low pass filter for filtering the second bitstream to produce a second IF signal;

an upconverter for upconverting the second IF signal to produce an upconverted output signal; and a transmitter for transmitting the upconverted output signal using the second TDMA format.

27. The satellite relay station of claim 26, where said buffer is a shift register.

28. The satellite relay station of claim 26, where said second TDMA format is a GSM format.

29. The satellite relay station of claim 26, wherein the number of time slots in the first TDMA format and the second TDMA format may be varied with different frames.

30. The satellite relay station of claim 26, wherein N, in the sampling rate of the first IF signal, is an integer.

31. The satellite relay station of claim 26, wherein M, in the rate at which the first bitstream is clocked out of the buffer, is an integer.

32. A satellite relay station according to claim 26, wherein the second bitstream is multiplexed with Slow Associated Control Channel (SACCH) information to provide the second signal using the second TDMA format.

33. A satellite relay station according to claim 32, wherein the SACCH information is provided to the satellite relay station by a ground station in the mobile satellite communications system.

34. A satellite transponder for supporting calls between two mobile stations within a satellite communication system, comprising:

means for receiving narrow band time division multiple access (TDMA) signals from said mobile stations at a satellite relay station;

means for relaying the received narrowband TDMA signals to at least one ground station;

means for digitizing some of the received narrowband signals;

means for time compressing said digitized signals;

means for multiplexing said time compressed signals into a wideband TDMA downlink format along with other signals from said at least one ground station; and means for transmitting said multiplexed signals to one of said mobile stations.

35. A satellite transponder according to claim 34, wherein said other signals from said at least one ground station are Slow Associated Control Channel Information (SACCH) signals.

36. A satellite transponder according to claim 35, wherein said SACCH signals are computed based upon the received narrowband signals relayed to said at least one ground station.

37. A satellite transponder according to claim 35, wherein said SACCH signals control transmit timing at said mobile stations.

* * * * *